(12) United States Patent
Kim

(10) Patent No.: US 7,616,286 B2
(45) Date of Patent: Nov. 10, 2009

(54) METHOD OF FORMING SPACER USING INK JET SYSTEM AND METHOD OF FABRICATING LIQUID CRYSTAL DISPLAY DEVICE

(75) Inventor: Tae-Man Kim, Gyeonggi-Do (KR)

(73) Assignee: LG Display Co., Ltd, Seoul (KR)

( * ) Notice: Subject to any disclaimer, the term of this patent is extended or adjusted under 35 U.S.C. 154(b) by 280 days.

(21) Appl. No.: 11/477,461

(22) Filed: Jun. 30, 2006

(65) Prior Publication Data
US 2007/0153216 A1    Jul. 5, 2007

(30) Foreign Application Priority Data
Dec. 29, 2005    (KR) ............... 10-2005-0134433

(51) Int. Cl.
*G02F 1/1339*    (2006.01)
(52) U.S. Cl. ................................. 349/157; 349/155
(58) Field of Classification Search ......... 349/155–157, 349/187, 189, 106; 358/505; 347/14, 41, 347/43
See application file for complete search history.

(56) References Cited

U.S. PATENT DOCUMENTS

| | | | |
|---|---|---|---|
| 6,364,450 B1 * | 4/2002 | Yamaguchi et al. | 347/33 |
| 6,667,795 B2 * | 12/2003 | Shigemura | 349/187 |
| 6,783,208 B2 * | 8/2004 | Kawase et al. | 347/41 |
| 7,101,440 B2 * | 9/2006 | Nakamura et al. | 118/663 |
| 7,152,946 B2 * | 12/2006 | Desie | 347/41 |
| 2002/0105688 A1 * | 8/2002 | Katagami et al. | 358/505 |
| 2002/0109741 A1 * | 8/2002 | Okabe et al. | 347/14 |
| 2003/0162317 A1 | 8/2003 | Tanaka et al. | |

FOREIGN PATENT DOCUMENTS

| | | |
|---|---|---|
| CN | 1439921 | 9/2003 |
| JP | 2003-303544 | 10/2003 |
| JP | 2003-308024 | 10/2003 |

* cited by examiner

*Primary Examiner*—Uyen Chau N Le
*Assistant Examiner*—Rhonda S Peace
(74) *Attorney, Agent, or Firm*—McKenna Long & Aldridge

(57) ABSTRACT

A method of forming a spacer using an ink jet system and a method of fabricating a liquid crystal display panel using the same are to remarkably prevent generation of stains that result from a difference of spacer density between two adjacent heads in a border region of the heads, when a spacer is formed on the substrate surface by using an ink jet system, by forming a spacer pattern in a comb-teeth shape by providing a predetermined amount of overlapping between the two heads, and randomly and alternately spraying an organic material used solution for the spacer through nozzles of the heads. The method of forming a spacer using an ink jet system includes: providing a substrate that is divided into a plurality of pixel regions; spraying an organic material solution to first pixel regions of the substrate by using a first head; spraying an organic material solution to second pixel regions of the substrate by using a second head that overlaps with the first head; non-linearly spraying an organic material solution to third pixel regions of the substrate by using the first and second heads; and hardening the organic material solution sprayed to each of the pixel regions.

18 Claims, 11 Drawing Sheets

METHOD OF FORMING SPACER USING INK JET SYSTEM AND METHOD OF FABRICATING LIQUID CRYSTAL DISPLAY DEVICE

This application claims the benefit of Korean Patent Application No. 10-2005-134433, filed on Dec. 29, 2006, which is hereby incorporated by reference for all purposes as if fully set forth herein.

BACKGROUND OF THE INVENTION

1. Field of the Invention

The present invention relates to a method of forming a spacer using an ink jet system and a method of fabricating a liquid crystal display device, and more particularly, to a method of forming a spacer using an ink jet system and a method of fabricating a liquid crystal display device that maintain a uniform cell gap between a color filter substrate and an array substrate and prevent the generation of stains in a border or overlap region when a spacer is formed by using an ink jet system.

2. Discussion of the Related Art

As the interest in information displays and the demand for portable information devices increase, research of light flat panel displays (FPD) as a substitute for cathode ray tubes (CRT) is ongoing. Particularly, liquid crystal display (LCD) devices are devices for displaying an image using optical anisotropy of a liquid crystal and are being actively used for in notebook computers and a desktop monitors because of their excellent resolution, color display and image quality.

In general, a liquid crystal display device is a display device that displays a desired image by individually supplying data signals corresponding to image information to liquid crystal cells arranged in a matrix and controlling the light transmittance of the liquid crystal cells.

Hereinafter, a liquid crystal display device will be described in detail with reference to FIG. 1.

FIG. 1 is an exploded perspective view schematically illustrating a construction of a liquid crystal display device.

As shown therein, a liquid crystal display device includes a color filter substrate 5 as a first substrate, an array substrate 10 as a second substrate, and a liquid crystal layer 40 interposed between the color filter substrate 5 and the array substrate 10.

The color filter substrate 5 includes a color filter C having red (R), green (G), and blue (B) sub color filters 7, a black matrix 6 that separates the sub color filters 7 from each other and blocks light transmitting the liquid crystal layer 40, and a common electrode 8 that is transparent and applies a voltage to the liquid crystal layer 40.

The array substrate 10 includes gate lines 16 and data lines 17 that are horizontally and vertically arranged and define pixel regions (P). A thin film transistor T (TFT), which is a switching device, is formed at a crossing of the gate line 16 and the data line 17. A pixel electrode 18 is formed on each of the pixel regions P.

The pixel region P is a sub pixel corresponding to one of the sub color filters 7 of the color filter substrate 5, and a color image is obtained by a combination of three types of the sub color filters 7, that is, red, green and blue sub color filters 7. In other words, three sub pixels of red, green and blue combine to thereby form one pixel, and the thin film transistors T are connected to the red, green and blue sub pixels, respectively.

A uniform cell gap between the color filter substrate 5 and the array substrate 10 that have the above-described constructions is maintained by a spacer (not shown). The color filter substrate 5 and the array substrate 10 are attached to each other by a seal pattern (not shown) formed along an outer edge of the color filter substrate 5 and the array substrate 10.

One method for forming the spacer includes randomly dispersing ball spacers, such as glass beads or a plastic beads, on the substrate surface according to a relatively simple process. However, because the ball spacers are randomly dispersed and it may be impossible to fix a position thereof, failure of the alignment layer may result because of movement of the ball spacer. In addition, a light leakage phenomenon occurs around the ball spacer by absorption between liquid crystal molecules adjacent to the ball spacer. Further, as liquid crystal display devices increase in size, it is difficult to maintain an accurate cell gap because of an accumulation phenomenon of the ball spacer. Therefore, an inferior image is generated.

Recently, instead of using ball spacers, a patterned spacer or a column spacer has been used, in which a photolithography process is used for the color filter substrate or an array substrate so as to form a spacer pattern at predetermined positions.

It is possible to prevent generation of light leakage by using a column spacer because it is possible to easily maintain a cell gap and form the column spacer so as to be fixed to a region covered by the black matrix.

However, because the column spacer is formed by performing a photolithography process that includes coating, exposing, developing and etching processes, it takes a large amount of time and money. In addition, since the column spacer is formed by physical and chemical processes like the above, it is likely to generate a defect on neighboring devices.

SUMMARY OF THE INVENTION

Accordingly, the present invention is directed to a method of forming a spacer using ink jet system and method of fabricating liquid crystal display device that substantially obviates one or more of the problems due to limitations and disadvantages of the related art.

An advantage of the present invention is to provide a method of forming a spacer using an ink jet system and a method of fabricating a liquid crystal display panel, by which a spacer is formed by using an ink jet apparatus that includes a simpler process and costs less than a photolithography process.

Another advantage of the present invention is to provide a method of forming a spacer using an ink jet system and a method of fabricating a liquid crystal display panel that prevents generation of stains in a border or overlap region when a spacer is formed according to the ink jet system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a method for forming a spacer that includes: providing a substrate that is divided into a plurality of pixel regions; spraying an organic material solution onto a first pixel region of the substrate by using a first head; spraying an organic material solution onto a second pixel region of the substrate by using a second head that overlaps the first head; spraying an organic material solution onto third pixel regions of the substrate by using the first and second heads, wherein the third pixel region has a first and second subregion that are adjacent to one another and wherein the location of the boundary between the first and second subregion varies for each row and wherein the first head sprays the first subregion and the second head sprays the second subregion; and hardening the organic material solution sprayed onto each of the pixel regions.

In another aspect of the present invention, there is provided a method of forming a spacer, that includes: providing a substrate that is divided into a plurality of pixel regions; spraying an organic material solution onto the pixel regions by using a first head or a second head; and hardening the organic material solution sprayed onto the pixel regions, wherein the organic material solution is alternately and randomly sprayed onto an overlap region, where the first head and the second head overlap each other, through first nozzles of the first head and second nozzles of the second head.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1:
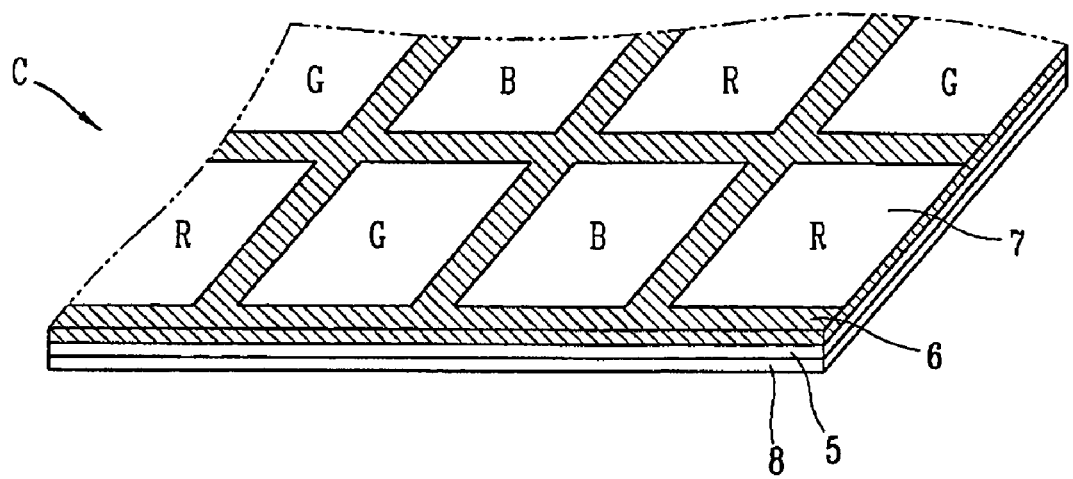
FIG. 1 is an exploded perspective view schematically illustrating a construction of a liquid crystal display device.
Figure 1:
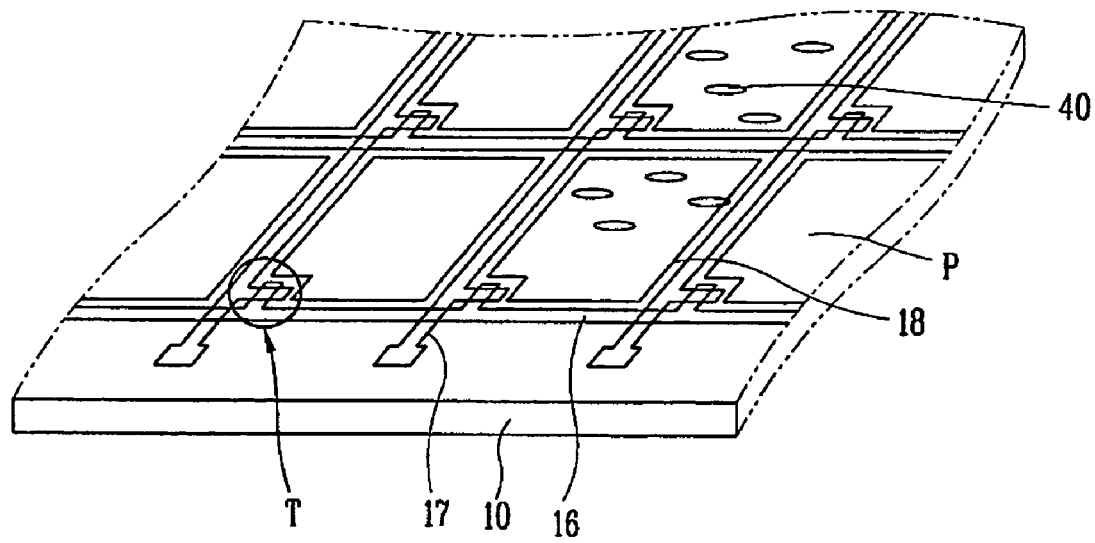
Figure 2:
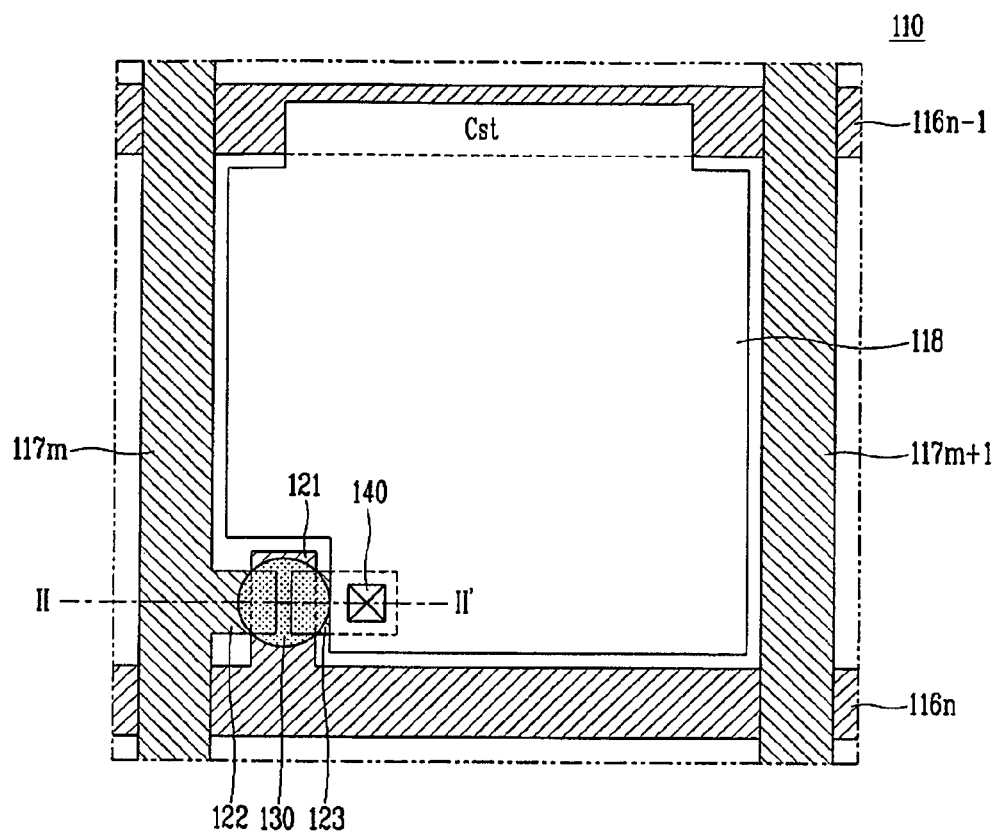
FIG. 2 is an exemplary view schematically illustrating part of an array substrate in accordance with an embodiment of the present invention.
Figure 3:
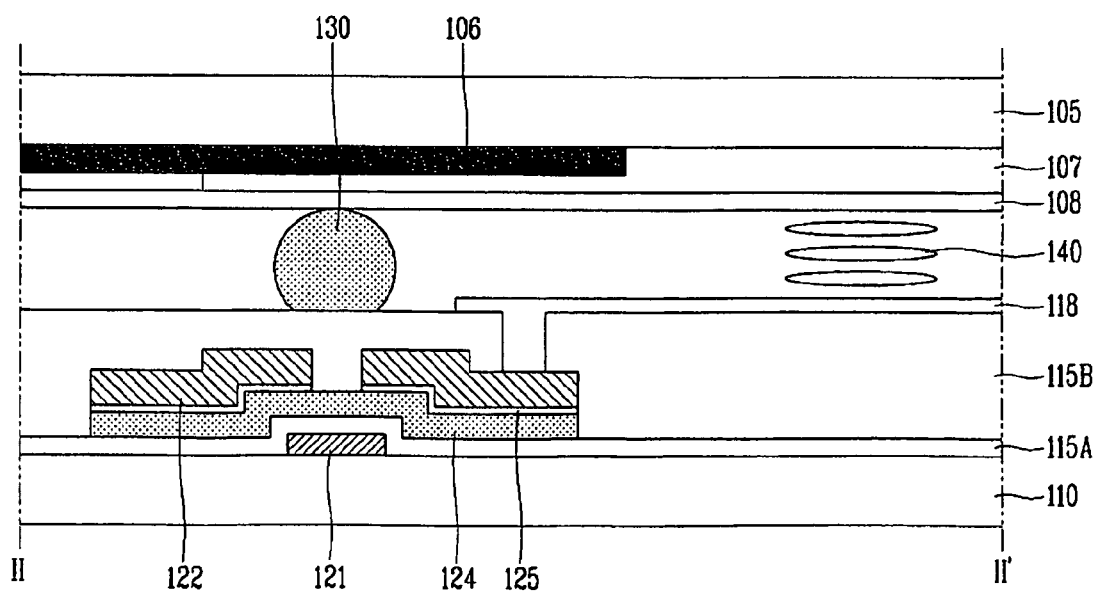
FIG. 3 is a view schematically illustrating a cross section of a liquid crystal display panel taken along the line II-II' of FIG. 2.

FIG. 2 is an exemplary view schematically illustrating part of an array substrate in accordance with the present invention. FIG. 3 is an exemplary view schematically illustrating a cross section of a liquid crystal display panel taken along the line II-II' of FIG. 2.

Even though the 'N' number of gate lines and the 'M' number of data lines cross each other to thereby form the 'M×N' number of pixels on an actual liquid crystal display panel, the (m, n)$^{th}$ pixel is shown in each of the drawings for the purpose of simplicity of description.

As shown in FIG. 2, an array substrate 110 corresponding to the (m, n)$^{th}$ pixel includes the n$^{th}$ gate line 116n, to which a scanning signal is applied from an external driving circuit (not shown), the m$^{th}$ data line 117m, to which an image signal is applied, a thin film transistor, which is a switching device, at a crossing of the n$^{th}$ gate line 116n and the m$^{th}$ data line 117m, and a pixel electrode 118 connected to the thin film transistor.

The thin film transistor includes a gate electrode 121 connected to the n$^{th}$ gate line 116n, a source electrode 122 connected to the m$^{th}$ data line 117m, and a drain electrode 123 connected to the pixel electrode 118. In addition, the thin film transistor includes a first insulating layer (not shown) for insulating the gate electrode 121 and the source/drain electrodes 122 and 123, and a semiconductor layer (not shown) that forms a conductive channel between the source electrode 122 and the drain electrode 123. Because a second insulating layer (not shown) having a contact hole 140 is formed on the drain electrode 123, the drain electrode 123 and the pixel electrode 118 are electrically connected to each other.

A part of the pixel electrode 118 protrudes toward a previous gate line, i.e. the n−1$^{th}$ gate line 116n−1 to thereby form a storage electrode. The storage electrode overlaps with a part of the n−1$^{th}$ gate line 116n−1 to thereby form a storage capacitor Cst. The storage capacitor Cst maintains a pixel voltage, with which the pixel electrode 118. is charged, until the pixel electrode 118 can be charged with the next pixel voltage.

Here, a spacer 130 is formed by using an ink jet system on an upper portion of the thin film transistor of the array substrate 110, such that the spacer 130 maintains a uniform cell gap when the array substrate 110 and a color filter substrate (not shown) are attached to each other.

In other words, as shown in FIG. 3, the array substrate 110 having the above-described construction is attached to an upper color filter substrate 105 by the spacer 130 and a seal pattern (not shown) formed on an outer edge of the array substrate 110.

A black matrix 106, a color filter 107, and a common electrode 108 are formed on the color filter substrate 105. The black matrix 106 is patterned at a boundary region of pixels, such that black matrix 106 prevents leakage of light generated from a backlight (not shown) and generation of color mixing between adjacent pixels.

The color filter 107 includes red (R), green (G), and blue (B) sub color filters. The color filter 107 overlaps with the black matrix 106 and corresponds to a unit pixel.

In addition, though not illustrated in the drawing, an over coat layer may be additionally formed on an upper part of the black matrix 106 and the color filter 107. The over coat layer flattens the upper surface of the black matrix 106 and the color filter 107.

As described above, the spacer 130 of the present invention is formed in a predetermined region between the color filter substrate 105 and the array substrate 110, such that the spacer 130 maintains a uniform cell gap between the color filter substrate 105 and the array substrate 110. Even though the spacer 130 is formed at an upper portion of the thin film transistor of the array substrate 110 as an example, the present invention is not limited to the example. As long as the spacer 130 is formed within the black matrix 106 region of the upper color filter substrate 105, it is possible to form the spacer 130 on another region of the array substrate 110, for example, on the gate lines 116n−1 and 116n, the data lines 117m and 117m+1, or crossings of the gate lines 116n−1 and 116n and the data lines 117m and 117m+1.

The spacer 130 is formed on the surface of the color filter substrate 105 or the array substrate 110 by using an ink jet system. According to the ink jet system, a light leakage phenomenon can be prevented despite absorption between neighboring liquid crystal molecules, and it is possible to accurately control a degree of density to thereby advantageously maintain a cell gap.

In addition, the spacer 130 according to the ink jet system is formed by spraying a liquid organic material through a plurality of nozzles and hardening the sprayed organic material by using heat or an ultra-violet rays, such that a process for manufacturing the spacer 130 is simpler and costs less than the process for the above-described column spacer.

Even though the spacer 130 is formed of a drop of an organic material solution as an example in the drawing, the present invention is not limited to this example. The spacer 130 may be formed of multiple drops of the organic material solution.

Figure 4:
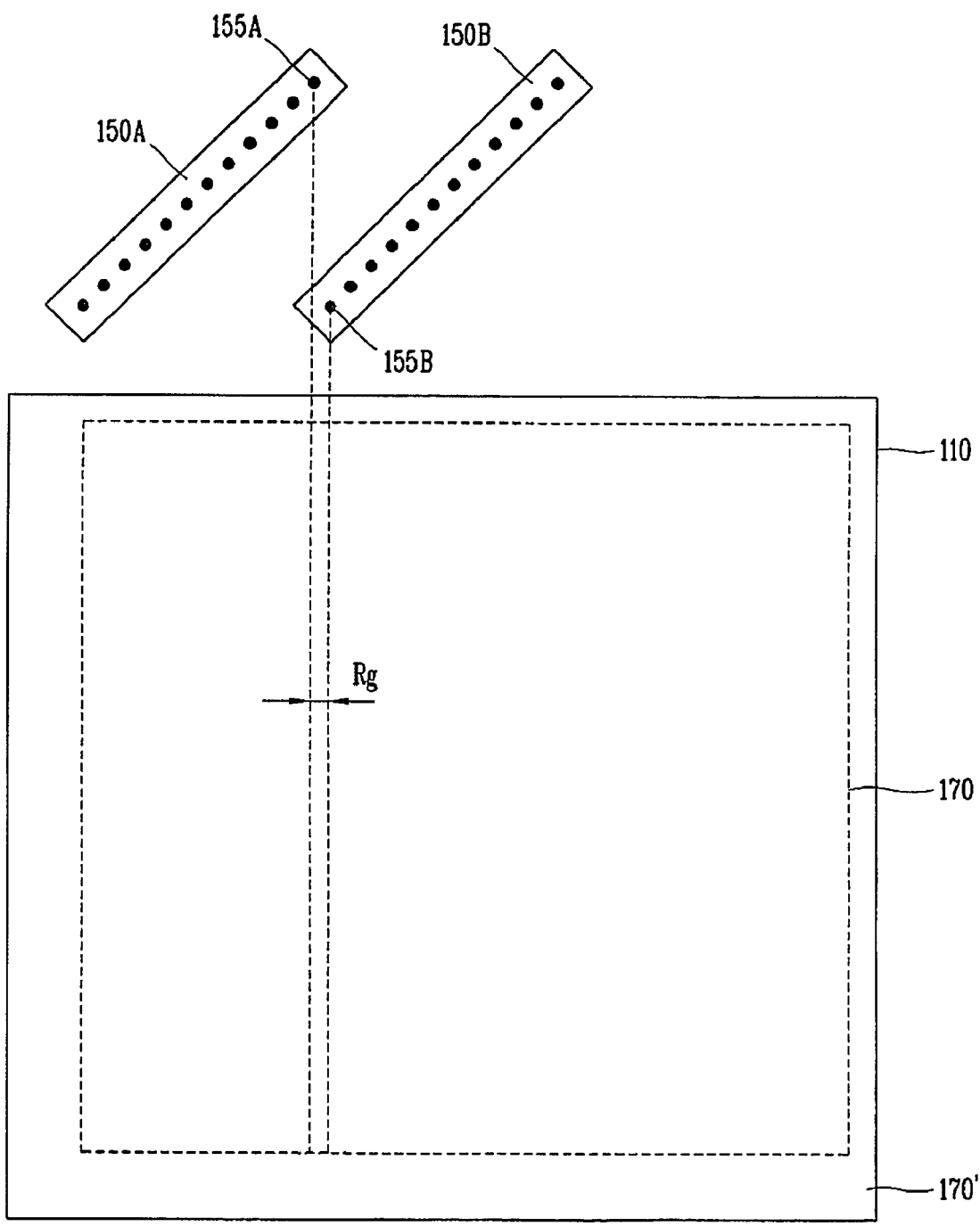
FIG. 4 is an exemplary view schematically illustrating a method of forming a spacer in accordance with a first embodiment of the present invention.

FIG. 4 is an exemplary view schematically illustrating a method of forming a spacer in accordance with a first embodiment of the present invention.

Even though a spacer is formed on a lower array substrate as an example in the drawing, the present invention is not limited to that example as it is possible to form a spacer on a color filter substrate.

As shown therein, an array substrate 110 includes an image display region 170, which includes a plurality of pixel regions (not shown) to thereby display an image, and an image non-display region 170' where a pad unit is located.

Each of the pixel regions is defined by a gate line (not shown) and a data line (not shown) that cross each other and exhibits a sub pixel corresponding to one sub color filter of an upper color filter substrate (not shown).

A spacer is formed on the image display region 170 by using a plurality of ink jet heads. Even though the spacer is formed on the array substrate 110 by using a first head 150A and a second head 150B in the drawing, the present invention is not limited thereto. It is possible to form a spacer by using three or more heads.

In accordance with the first embodiment, the first head 150A and the second head 150B form a spacer by spraying an organic material solution used for the spacer on the surface of the array substrate 100 while first nozzles 155A of the first head 150A and second nozzles 155B of the second head 150B are disposed not to overlap each other. Here, there is a predetermined distance between the final nozzle of the first nozzles 155A of the first head 150A and the first nozzle of the second nozzle 155B of the second head 150B.

The first head 150A and the second head 150B have at least one first nozzle 155A and at least one second nozzle 155B, respectively. Each of the first nozzles 155A and the second nozzles 155B may be arranged in a zigzag manner. In addition, each of the first head 150A and the second head 150B may be inclined at a predetermined angle relative to a horizontal direction of the array substrate 110 and sprays an organic material solution. By inclining the first head 150A and the second head 150B, the distance between the first heads 155A of the first head 150A and the distance the second heads 155B of the second head 150B coincide with the distance between the pixel regions of the image display region 170A.

However, a border region Rg between the first head 150A and the second head 150B becomes stained because of the nonuniformly sprayed organic material solution between the first head 150A and the second head 150B. That is, when the organic material solution is sprayed through the first nozzles 155A of the first head 150A and the second nozzles 155B of the second head 150B, a density difference of the organic material solution occurs in the border region. In this case, because a difference of the cell gap occurs in the border region Rg, a stain appears to make the border region Rg clearly visible.

Figure 5:
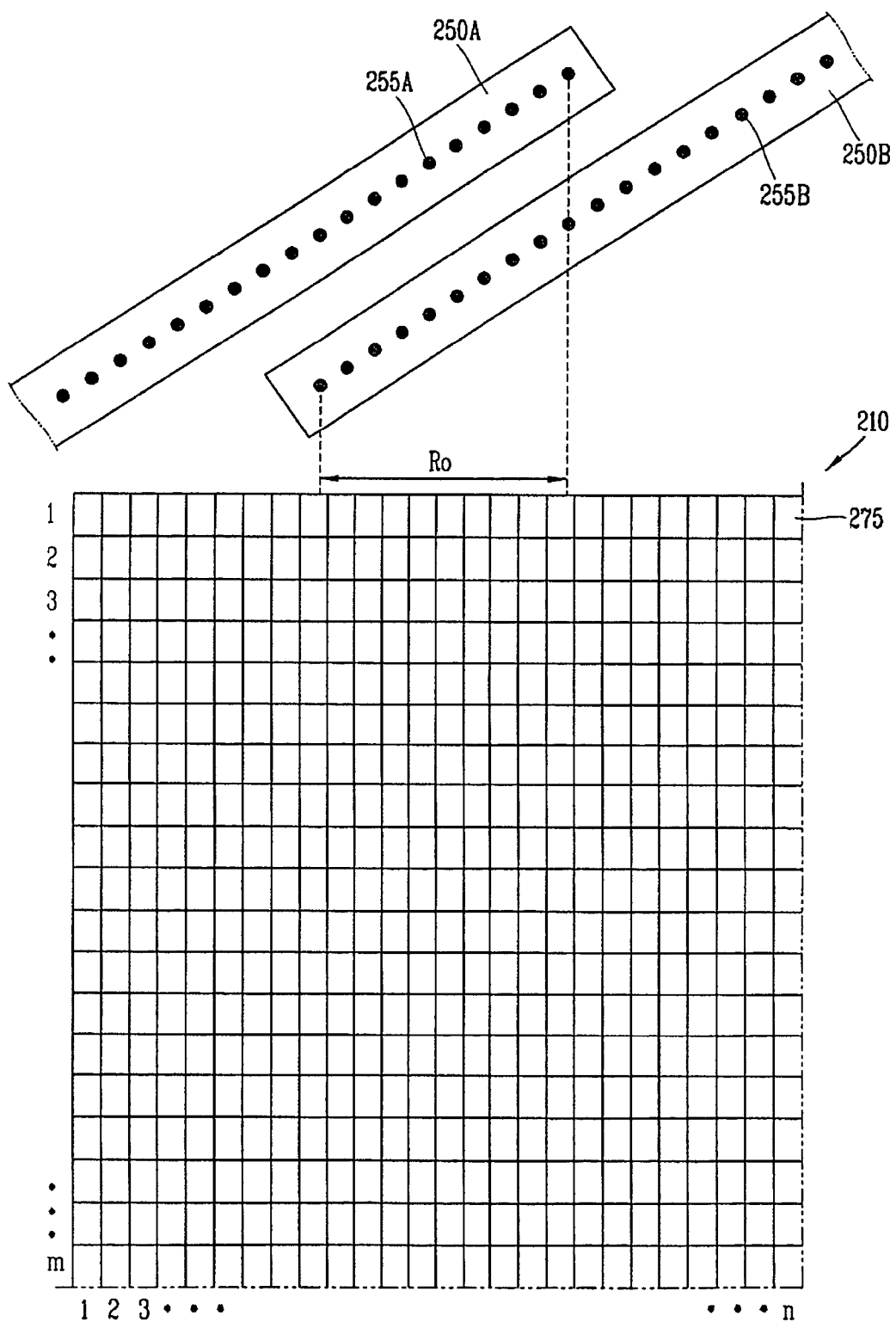
FIG. 5 is an exemplary view schematically illustrating a method of forming a spacer in accordance with a second embodiment of the present invention.

FIG. 5 is an exemplary view schematically illustrating a method of forming a spacer in accordance with a second embodiment of the present invention, in which part of ink jet heads and an array substrate, on which a spacer is formed by the heads, in accordance with the present embodiment, are illustrated as an example.

As shown therein, even though an image display region of an array substrate 210 includes a plurality of pixel regions 275, part of the array substrate 210, on which the 'n×m' number of the pixel regions 275 are illustrated, is illustrated for the purpose of simplicity.

In addition, even though a spacer is formed on the pixel regions 275 of the array substrate 275 by using a first head 250A and a second head 250B, the present invention is not limited thereto. The spacer may be formed by using three or more heads. Here, for the purpose of simplicity, the front part of the first head 250A and the rear part of the second head 250 are omitted.

As described above, the 'n×m' number of pixel regions 275 are regions defined by crossing the 'n' gate lines 216 and the 'm' data lines 217 with each other. The pixel regions 275 indicate sub pixels corresponding to sub color filters of an upper color filter substrate (not shown).

A spacer is formed on each of the pixel regions 275 by using the first head 250A and the second head 250B according to an ink jet system. The first head 250A and the second head 250B, in accordance with the second embodiment, spray an organic material solution used for a spacer onto the surface of an array substrate 200 to thereby form a spacer, while part of first nozzles 255A of the first head 250A overlap with part of second nozzles 255B of the second head 250B. Even though the first head 250A and the second head 250B are disposed such that ten first nozzles 255A from the end of the first head 250A overlap with ten second nozzles 255B from the start of the second head 25B in the drawing, the present invention is not limited thereto. However, as long as part of the first nozzles 255A of the first head 250A and part of the second nozzles 255B of the second head 250B overlap each other, the present invention is applied regardless of the number of the first nozzles 255A and the second nozzles 255B that overlap each other.

The first head 250A and the second head 250B include a plurality of first nozzles 255A and second nozzles 255B, respectively. Here, each of the first nozzles 255A and the second nozzles 255 may be arranged in a zigzag manner on the first head 250A and the second head 250B, respectively. In addition, each of the first head 250A and the second head 250B may be inclined at a predetermined angle relative to a horizontal direction of the array substrate 210 and sprays an organic material solution. By inclining the first head 250A and the second head 250B, the distance between the first heads 255A of the first head 250A and the distance between second heads 255B of the second head 250B coincide with the distance between the pixel regions of the image display region 270A.

As the first head 250A and the second head 250B, having the above construction according to the second embodiment, are moved from one end to the other end of the array substrate 210, the first head 250A and the second head 250B jet the organic material solution on the surface of the array substrate 210 through the first nozzles 255A of the first head 250A and the second nozzles 255B of the second head 250B, such that a spacer is formed on each of the pixel regions 275. Here, the first head 250A and the second head 250B may not be moved in a predetermined direction relative to the array substrate 210, but a table (not shown) or a stage in which the array substrate 210 is loaded may be moved in a predetermined direction relative to the first head 250A and the second head 250B.

Here, in the present embodiment, when a predetermined overlapping amount between the first head 250A and the second head 250B is given, and at the same time, an organic material solution is randomly and alternately sprayed on a border region Ro, where the first head 250A and the second head 250B overlap each other, through the first nozzles 255A of the first head 250A and the second nozzles 255B of the second head 250B, a spacer pattern having a comb-teeth shape is formed. Accordingly, it is possible to prevent generation of stains in the border region Ro due to the density difference of the organic material solution between the first head 250A and the second head 250B. This will be described in detail with reference to the drawings.

Figure 6A:
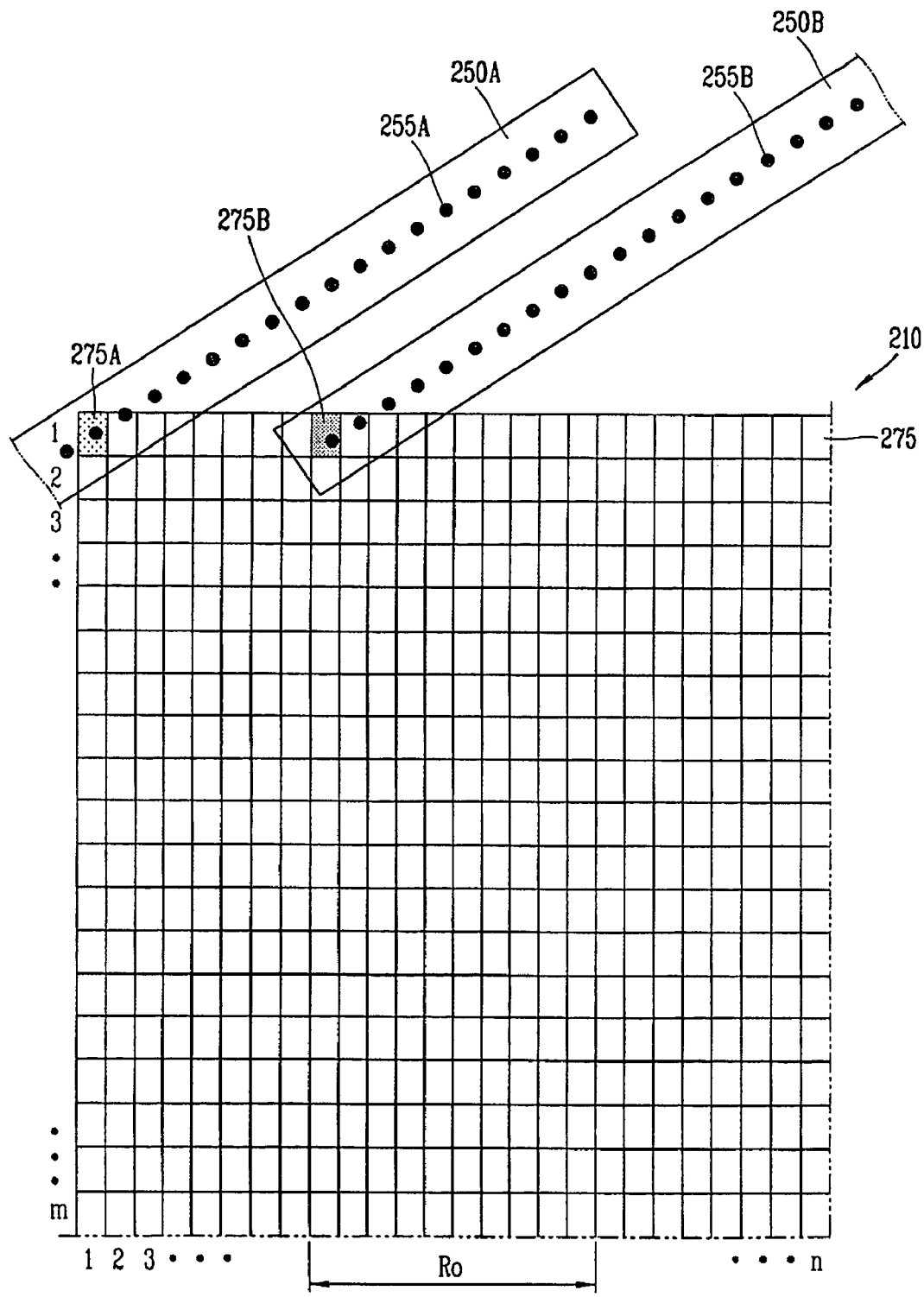
FIGS. 6A to 6E are exemplary views sequentially illustrating the method of forming a spacer shown in FIG. 5.
Figure 6B:
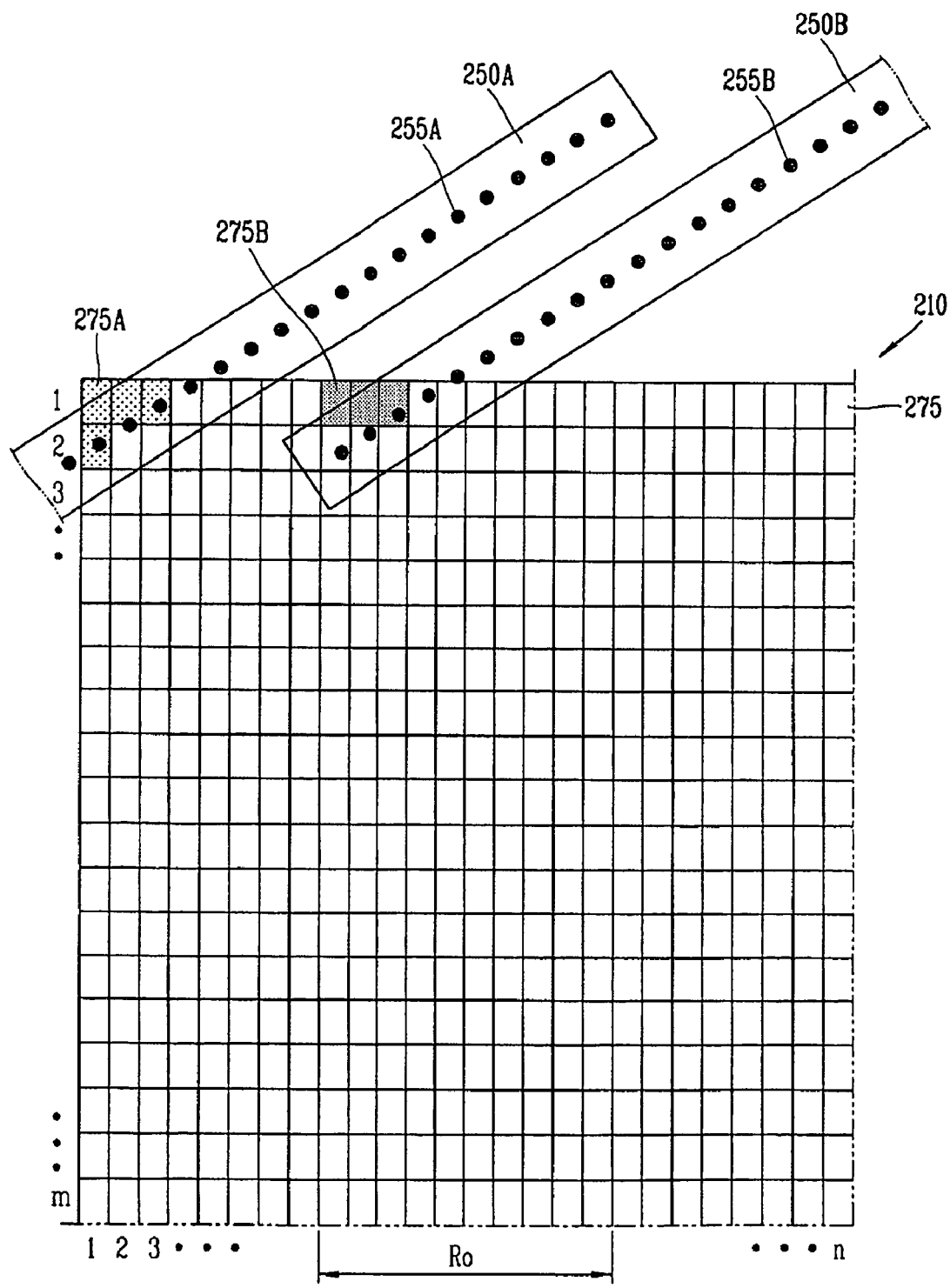

FIGS. 6A and 6B are exemplary views sequentially illustrating the method of forming a spacer illustrated in FIG. 5.

As shown in FIG. 6A, the organic material solution is sprayed onto the pixel regions 275, in the first line of the array substrate 210 by using the first head 250A and the second head 250B. The sprayed organic material solution becomes a spacer that maintains a cell gap between the array substrate 210 and the upper color filter substrate (not shown). After the organic material solution is completely sprayed onto all the pixel regions 275 of the array substrate 210, the above-described hardening process is performed.

For the purpose of simplicity, the pixel regions 275, on which a first spacer is formed by spraying the organic material solution by the first head 250A, are referred to as the first pixel regions 275A, and the pixel regions 275, on which a second spacer is formed by spraying the organic material solution by the second head 250B, are referred to as the second regions 275B.

At a region where the first head 250A and the second head 250B do not overlap each other, the first spacer is formed by using the second nozzle 255A of the first head 250A and the second spacer is formed by using the first nozzle 255B of the second head 250B. At the border region Ro where the first head 250A and the second head 250B overlap each other, the organic material solution is sprayed by controlling the first nozzles 255A of the first head 250A and the second nozzles 255B of the second head 250B, which overlap each other, such that the first pixel regions 275A randomly alternate with the second pixel regions 275B. The first pixel regions 275A randomly alternate with the second pixel regions 275B in such a manner that a start position of the second pixel region 275B is randomly determined at the border region Ro when the second pixel region 275B is set as a reference. That is, start positions of the second pixel regions 275B are differently located according to rows, such that a spacer pattern in a comb-teeth shape is formed. Once the start position of the second pixel region 275B is determined with respect to one row, the remaining pixel regions 275 in the right direction on the basis of the determined second pixel region 275B are determined as pixel regions 255B, and thus the organic material solution is sprayed by the second head 250B.

Like the present embodiment, when a start position of the second pixel region 275B is determined with respect to a first row by spraying the organic material solution onto the $(9 \times 1)^{th}$ pixel region 275 through a first nozzle 255B of the second head 250B, as shown in FIG. 6B, the organic material solution is sprayed onto the $(10 \times 1)^{th}$ pixel region 275 and the $(11 \times 1)^{th}$ pixel region 275 through a second nozzle 255B and a third nozzle 255B, respectively, such that the second pixel regions 275B are formed.

Further, the first pixel regions 275A on which the first spacer is formed by the first head 250A become the $(1 \times 1)^{th}$ pixel region 257, the $(2 \times 1)^{th}$ pixel region 275, the $(3 \times 1)^{th}$ pixel region 275, the $(1 \times 1)^{th}$ pixel region 275. The second pixel regions 275B on which the second spacer is formed by the second head 250B become $(9 \times 1)^{th}$ pixel region 275, $(10 \times 1)^{th}$ pixel region 275, and the $(1 \times 1)^{th}$ pixel region 275.

Second pixel regions 275B do not exist at the border region Ro of the second row yet, because the organic material solution is randomly sprayed onto the border region Ro by using the second head 250B. It can be said that a start position of the second pixel region 275 of the second row is not determined yet.

Figure 6C:
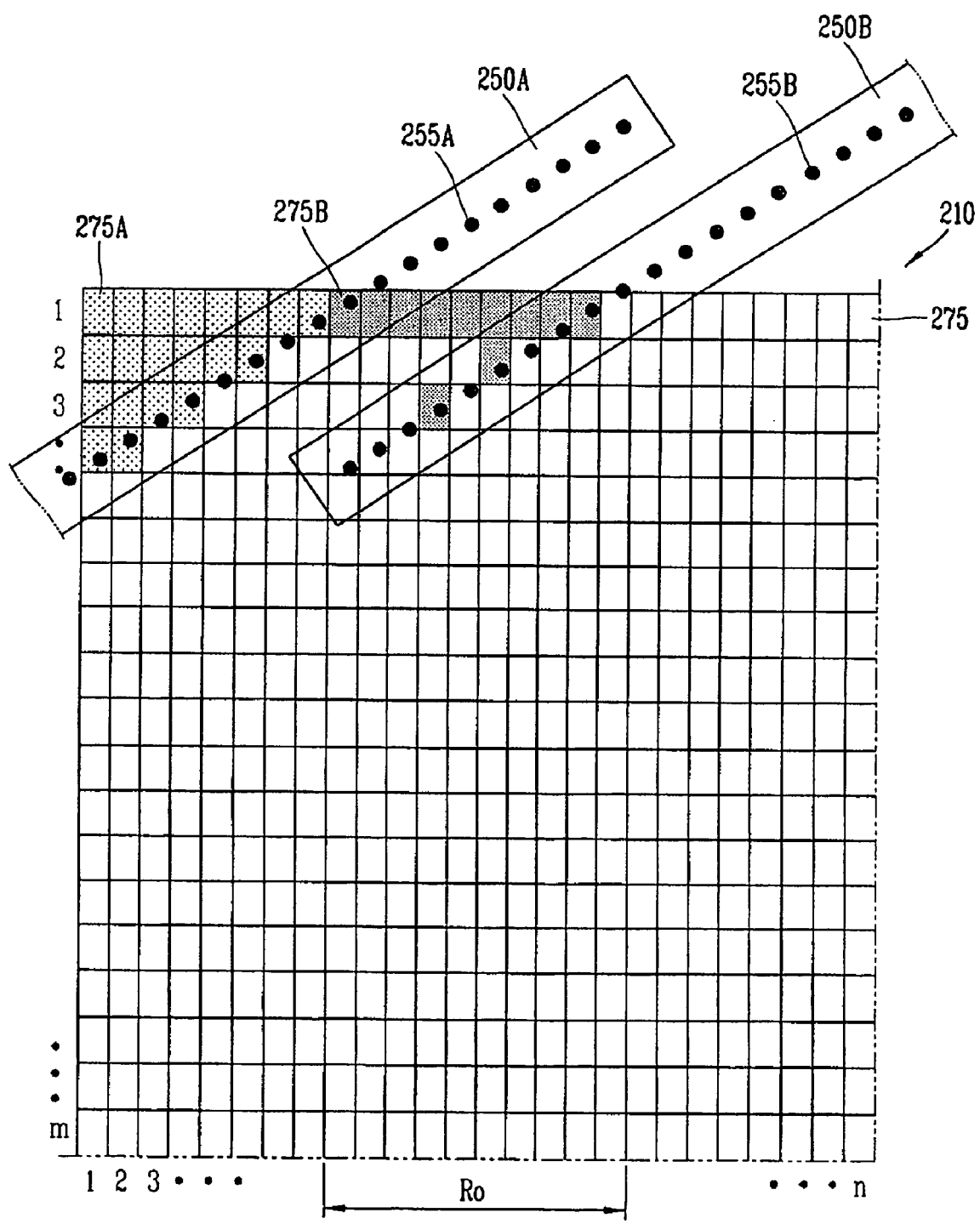

Thereafter, when the organic material solution continues to be sprayed by the first head 250A and the second head 250B, as shown in FIG. 6C, the $(1 \times 1)^{th}$ to the $(1 \times 8)^{th}$ pixel regions 275, the $(1 \times 2)^{th}$ to the $(6 \times 2)^{th}$ pixel regions 275, the $(1 \times 3)^{th}$ to the $(4 \times 3)^{th}$ pixel regions 275, and the $(1 \times 4)$ to the $(2 \times 4)^{th}$ pixel regions 275 become the first pixel regions 275A on which the first spacer is formed. Further, the $(9 \times 1)^{th}$ to the $(17 \times 1)^{th}$ pixel regions, the $(14 \times 2)^{th}$ pixel region, and the $(12 \times 3)^{th}$ pixel region become the second pixel regions 275B on which the second spacer is formed.

Here, in the border region Ro, the organic material solution is sprayed through a sixth nozzle 255B of the second head 250B to thereby determine the start position of the second pixel region 275B in the second row, and the organic material solution is sprayed through a fourth nozzle 255B of the second head 250B to thereby determine a start position of the second pixel region 275B in the third row. When the start points of the second pixel regions 275B in the second and third rows are determined, the remaining pixel regions 275 in the second and third rows in the right direction relative to the determined starts points of the second pixel regions 275 are determined as the pixel regions 255B. Further, the organic material solution is sprayed by the second head 250B.

The remaining pixel regions 275 located on the left of the start position of the second pixel region 275B are selected as first pixel regions 275A. Further, the organic material solution is sprayed by the first nozzles 255A of the first head 250A. For example, in the first row, when the $(9 \times 1)^{th}$ pixel region 275 is determined as a start position of the second pixel region 275B, the remaining pixel regions 275 from the $(1 \times 1)^{th}$ pixel region 275 to the $(8 \times 1)^{th}$ pixel region 275 which are disposed on the left of the $(9 \times 1)^{th}$ pixel region 275 become the first pixel regions 275A on which the first spacer is formed.

Figure 6D:
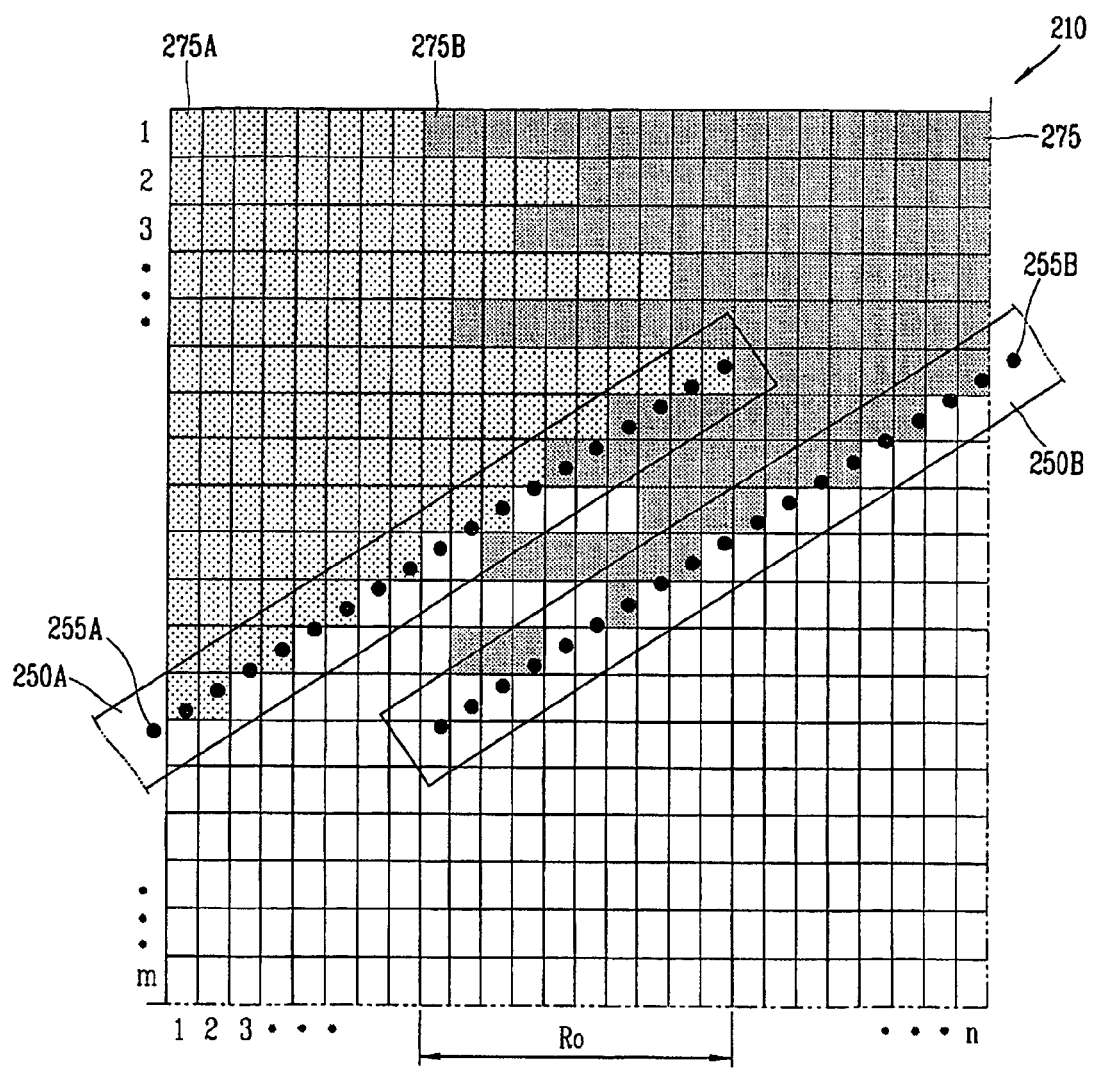
Figure 6E:
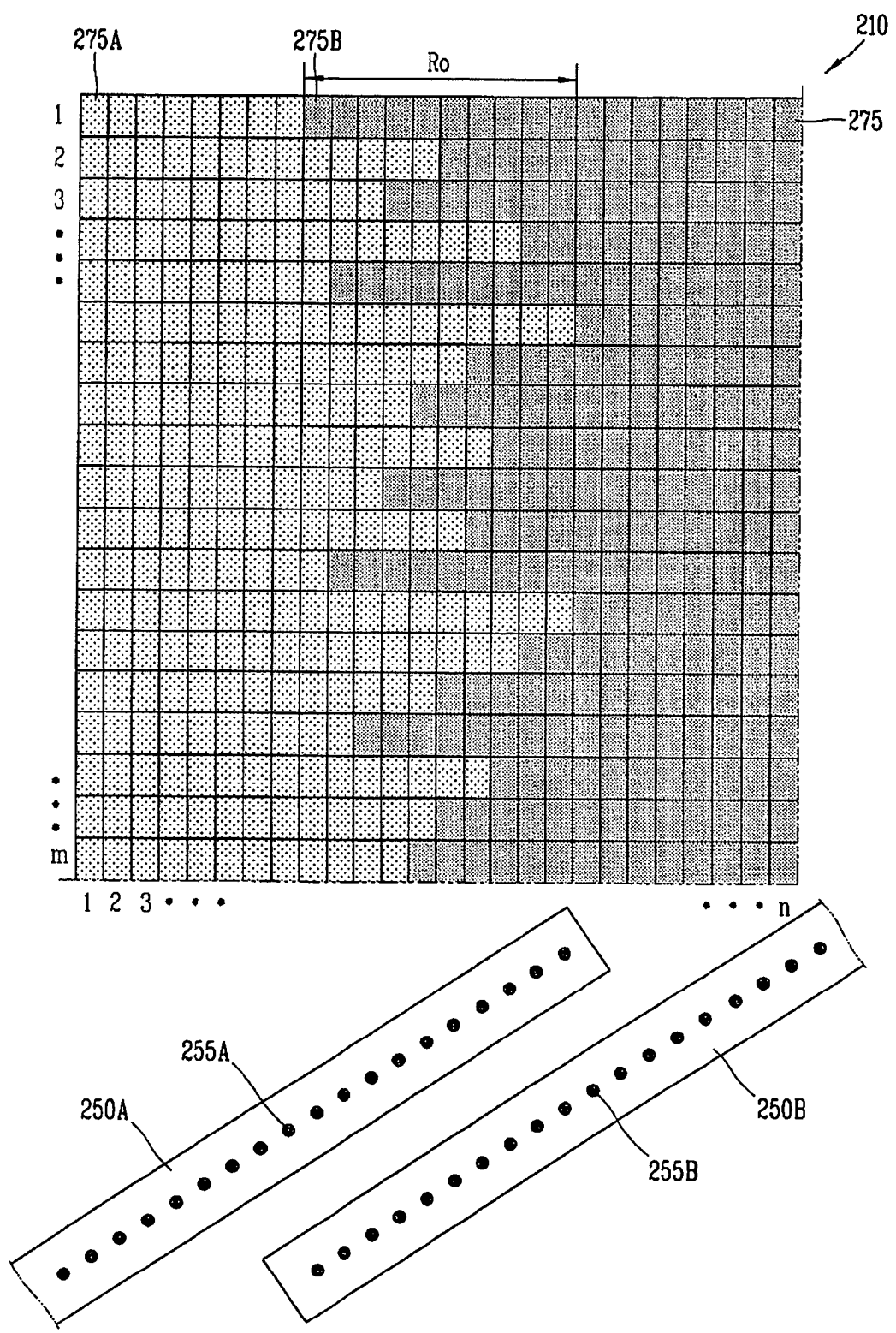

As shown in FIGS. 6D to 6E, as the above-described process is performed up to the $m^{th}$ pixel, the first pixel regions 275A on which the first spacer is formed and the second pixel regions 275B on which the second spacer is formed are formed on the array substrate 210 by the first nozzles 255A of the first head 250A and the second nozzles 255B of the second head 250B.

In the border region Ro where the first head 250A and the second head 250B overlap each other, the first pixel regions 275A on which the first spacer is formed randomly alternate with the second pixel regions 275B on which the second spacer is formed, thereby forming a kind of a random combtooth shape.

Thereafter, a hardening process of hardening the organic material solution sprayed onto the pixel regions 275 is performed such that the first spacer is formed on the first pixel regions 275A and the second spacer is formed on the second pixel regions 275B.

As described above, when the spacer pattern in the random comb-tooth shape is formed at the predetermined border region Ro where the first head 250A and the second head 250B overlap each other, it is possible to remarkably reduce a gap difference generated between the first head 250A and the second head 250B because of the density difference of the organic material solution between the first head 250A and the second head 250B. Therefore, it is possible to reduce a stain in the border region Ro. That is, when the first pixel regions 275A and the second pixel regions 275B alternate with each other so as to form a random comb-tooth shape at the border region Ro, the border is not clearly recognized and thus it is not detected as a defect.

Hereinafter, a method for fabricating a liquid crystal display panel by using this method of forming a spacer will be described in detail.

Figure 7:
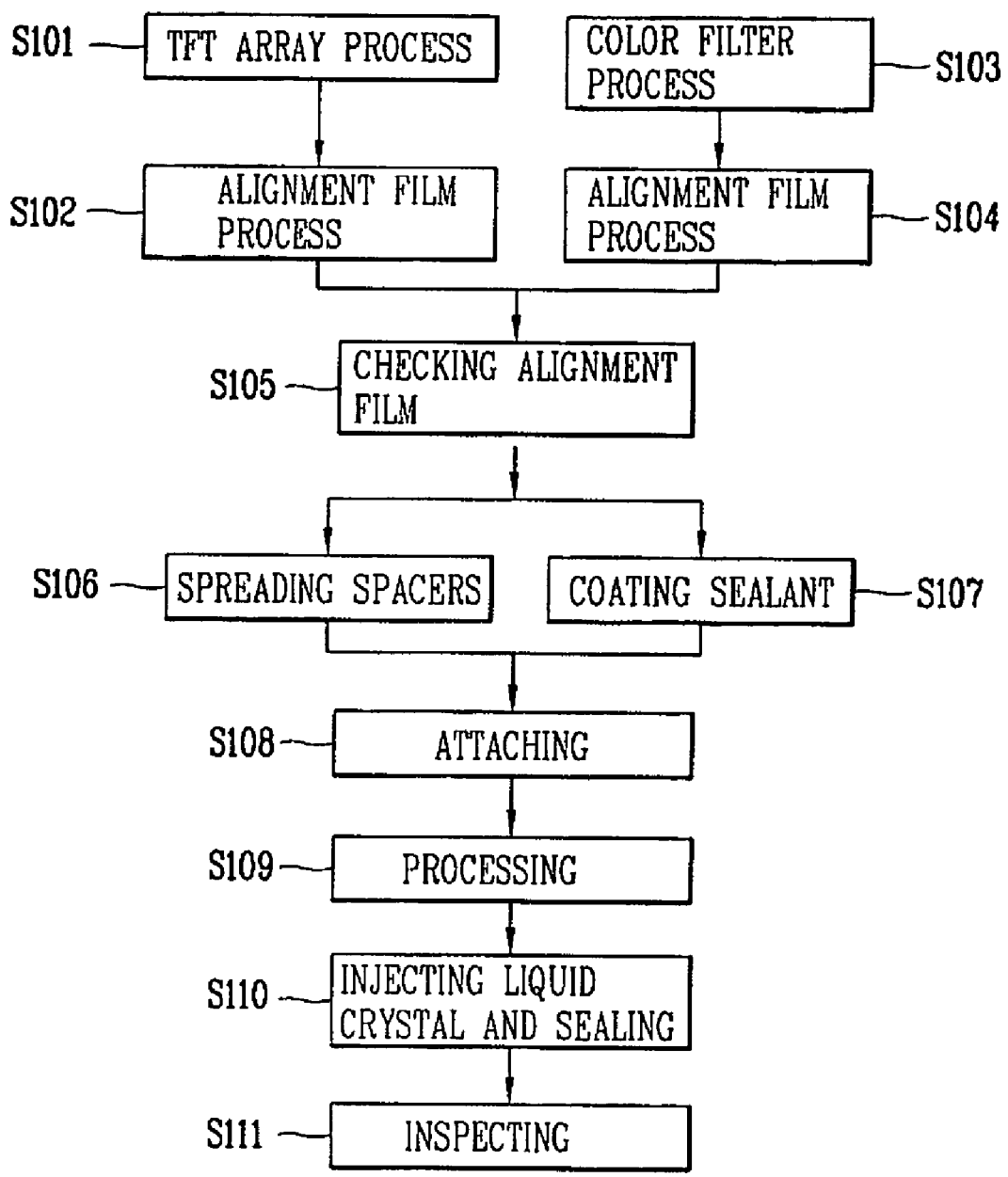
FIG. 7 is a flowchart sequentially illustrating a method of fabricating a liquid crystal display device in accordance with the present invention.
Figure 8:
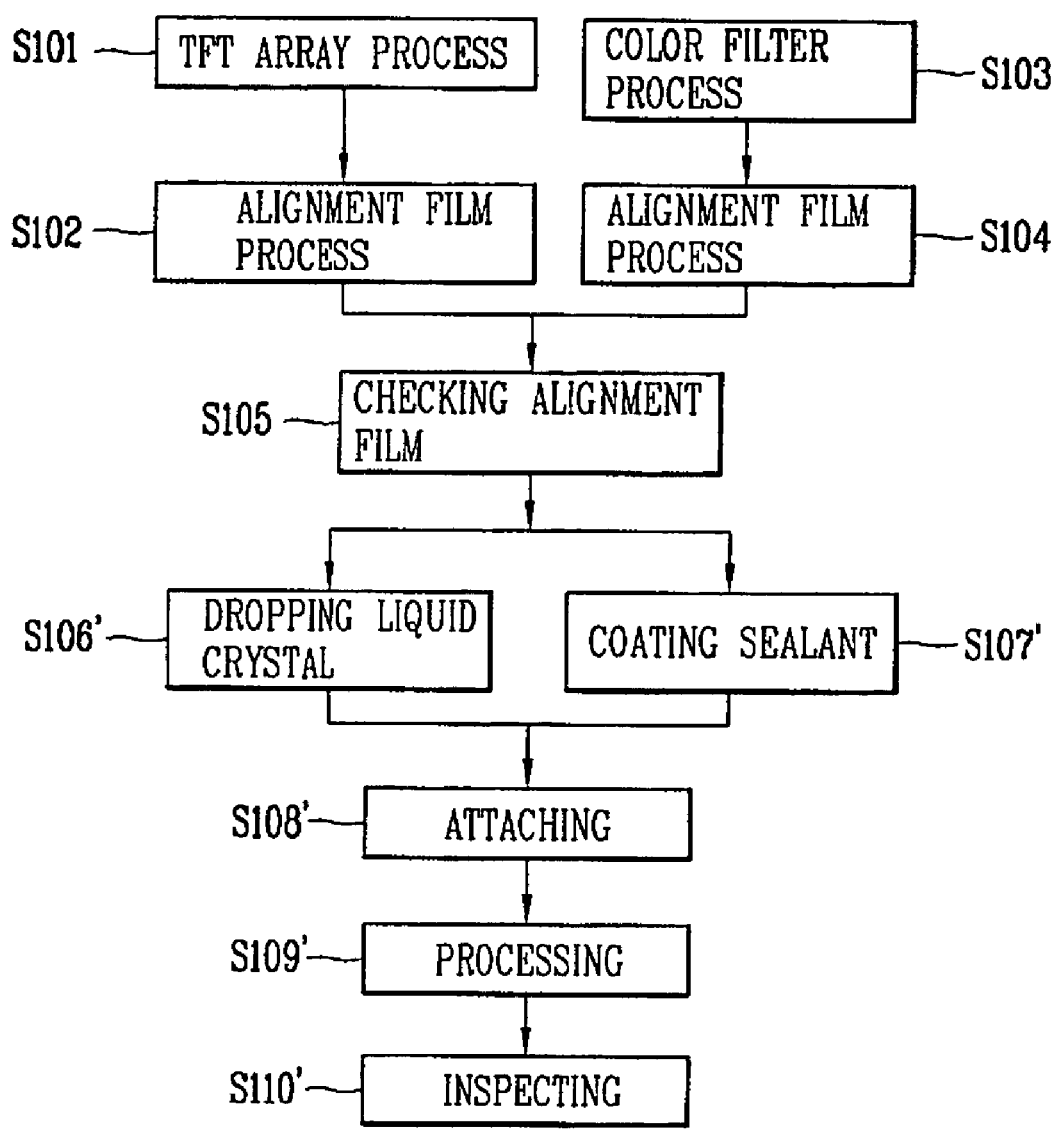
FIG. 8 is a flowchart sequentially illustrating another method of fabricating a liquid crystal display device in accordance with the present invention.

FIG. 7 is a flowchart sequentially illustrating a method of fabricating a liquid crystal display panel in accordance with the present invention. FIG. 8 is a flowchart sequentially illustrating another method of fabricating a liquid crystal display panel in accordance with the present invention.

FIG. 7 shows a method of fabricating a liquid crystal display panel when a liquid crystal layer is formed according to a liquid crystal injecting method. FIG. 8 shows a method a method of fabricating a liquid crystal display device when a liquid crystal layer is formed according to a liquid crystal dropping method.

A process of fabricating a liquid crystal display device includes a driving device array process for forming a driving device on a lower array substrate, a color filter process for forming a color filter on an upper color filter substrate, and a cell process.

First, according to the array process, a plurality of gate lines and data lines that are arranged on a lower substrate and define pixel regions are formed, and a thin film transistor, which is a driving device connected to the gate line and the data line, is formed on each of the pixel regions (S101). In addition, according to the array process, a pixel electrode that is connected to the thin film transistor and drives a liquid crystal layer when a signal is applied through the thin film transistor is formed.

Further, according to the color filter process, a color filter layer that includes red, green and blue sub color filters for displaying colors, and a common electrode are formed on an upper substrate (S103). Here, when an IPS (In Plane Switching) mode liquid crystal display device is formed, the common electrode is formed on the lower substrate on which the pixel electrode is formed according to the array substrate.

Moreover, after an alignment layer is coated on each of the upper and lower substrates, the alignment layer is aligned so as to provide an alignment controlling force or a surface anchoring force (i.e., so as to set a pre-tilt angle and orientation direction) to liquid crystal molecules of a liquid crystal layer formed between the upper and lower substrates (S102 and S104). The aligning the alignment layers may include a rubbing method or a light-aligning method.

The upper and lower substrates are inspected by an apparatus for inspecting an alignment layer so as to check the quality of the alignment layers (S105) when the rubbing process is completed.

The liquid crystal display panel uses an electrooptic effect of a liquid crystal. Because the electrooptic effect is determined by the optical anisotropy of the liquid crystal and arrangement of liquid crystal molecules, the controlling of arrangement of liquid crystal molecules greatly affects the display quality of the liquid crystal display panel.

Accordingly, the process for forming an alignment layer so as to effectively align liquid crystal molecules is very important in relation to image quality in the liquid crystal cell process.

A method of inspecting such rubbing inferiority includes a first inspection that is performed after coating an alignment layer so as to check whether a stain, a stripe, or a pin hole exists on the surface of the alignment layer, and a second inspection that is performed after rubbing the alignment layer checks how uniform the surface of the rubbed alignment layer is and whether a scratch is on the surface thereof or not.

As shown in FIG. 7, spacers for maintaining a uniform cell gap are sprayed through nozzles according to the-above described ink jet system and formed on the lower substrate after the alignment layer inspection is finished. A sealant is coated on an outer edge of the upper substrate. The, the lower substrate and the upper substrate are attached to each other and are pressurized (S106, S107, and S108).

Each of the lower substrate and the upper substrate includes a large-sized mother substrate. In other words, because a plurality of panel regions are formed on the large-sized mother substrate, and a thin film transistor, which is a driving device, and a color filter layer are formed on each of the panel regions, the mother substrate need to be cut and processed in order to fabricate individual liquid crystal display panels (S109).

Thereafter, a liquid crystal is injected into each of the liquid crystal display panels through a liquid crystal injection hole, the liquid crystal injection hole is sealed to form a liquid crystal layer, and each of the liquid crystal panels is inspected, such that liquid crystal display panels are fabricated (S110 and S111).

Here, the liquid crystal is injected according to a vacuum injection method using a pressure difference. According to the vacuum injection method, a vacuum is created in a liquid crystal panel having the injection hole, and the panel is immersed in a container filled with a liquid crystal. Further, the liquid crystal is injected into each of the unit liquid crystal display panels, cut from the large-sized mother substrate, due to a pressure difference between the inside and outside of the liquid crystal display panel caused by the vacuum. After the liquid crystal is injected into the liquid crystal display panel, the liquid crystal injection hole is sealed to thereby form a liquid crystal layer. Accordingly, when the liquid crystal layer is formed on the liquid crystal display panel according to the vacuum injection method, part of a seal pattern should be opened such that the opened part serves the liquid crystal injection hole.

However, the above-described vacuum injection method has problems as follows.

First, it takes a very long period of time to fill the liquid crystal display panel with a liquid crystal. In general, because the attached liquid crystal display panel has a gap of several µm versus an area of hundreds of $cm^2$, the amount of a liquid crystal being injected per unit time is very small even though the vacuum injection method using a pressure difference is used. For example, when a liquid crystal display panel of about 15" is fabricated, it takes about eight hours to fill the liquid crystal display panel with a liquid crystal. Therefore, a long period of time is required to fabricate the liquid crystal display panel, thereby reducing productivity. In addition, as the liquid crystal display device increases in size, it takes a longer period of time, and the liquid crystal is not filled completely and evenly. As a result, it may be impossible to the increase the size of the liquid crystal display panel.

Second, a large amount of liquid crystal is consumed. In general, the amount of liquid crystal that is actually injected into the liquid crystal display panel is very small in comparison with the amount of liquid crystal filling in the container. When the liquid crystal is exposed to the air or a specific gas, the liquid crystal reacts to the gas and is deteriorated. Therefore, even though a plurality of liquid crystal display panels are filled with the liquid crystal in the container, a large amount of the liquid crystal remains after the filling, and it should be disposed. Because the expensive liquid crystal is disposed, a unit cost of the liquid crystal display panel increases. As a result, price competitiveness is reduced.

In order to solve the above-described problems of the vacuum injection method, a drop method may be used.

As shown in FIG. 8, when the drop method is used, after the alignment layer inspection (S105) is completed, a predetermined seal pattern is formed on the color filter substrate by using a sealant, and at the same time, a liquid crystal layer is formed on the array substrate (S106' and S107').

According to the drop method, a liquid crystal is dropped and dispensed onto an image display region of a first mother substrate, on which a plurality of array substrates are formed, or a second mother substrate, on which a plurality of color filter substrates are arranged. Further, the liquid crystal is uniformly distributed on the entire image display region by a pressure that is applied when the first and second mother substrates are attached to each other so as to form a liquid crystal layer.

Accordingly, when the liquid crystal layer is formed on the liquid crystal display panel by using the drop method, the seal pattern should be formed in a closed pattern that encompasses the complete outer edge of the pixel regions so as to prevent the liquid crystal from leaking to the outside of the image display region.

According to the drop method, it is possible to drop a liquid crystal for a short period of time in comparison to the vacuum injection method, and quickly form a liquid crystal layer when the liquid crystal display panel increases in size.

In addition, because the necessary amount of liquid crystal is dropped onto the substrate, price competitiveness is increased by preventing an increase in a unit cost of the liquid crystal display device panel that results from disposal of expensive excess liquid crystal.

Thereafter, when the upper and lower substrates, onto which the liquid crystal is dropped and the sealant is coated, are aligned, a pressure is applied thereto to thereby attach the upper and lower substrates to each other, and at the same time, the dropped liquid crystal is uniformly spread over the entire liquid crystal display panel by the applied pressure (S108'). Here, the spacers formed according to the above-described ink jet system are located at the upper or lower substrates so as to maintain a uniform cell gap between the upper and lower substrates when the upper and lower substrates are attached each other.

According to the above-described process, a plurality of liquid crystal display panels, on which the liquid crystal layer is formed, are formed on the large-sized mother substrates (upper and lower substrates), and this glass substrate is processed and cut into a plurality liquid crystal display panels according to the above-described cutting method for liquid crystal panels in accordance with the present invention (S109'). Each of the liquid crystal panels is inspected to thereby fabricate liquid crystal display panels (S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for forming a spacer, comprising:
providing a substrate that is divided into a plurality of first, second and third pixel regions,
wherein the plurality of first, second and third pixel regions are defined by a plurality of gate and data lines crossing each other and
wherein the plurality of third pixel regions have first and second subregions that are adjacent to one another;
providing an ink jet system that includes a first head having a plurality of first nozzles and a second head having a plurality of second nozzles, wherein part of the first head overlaps with part of the second head at the plurality of third pixel regions;
spraying an organic material solution onto the plurality of first pixel regions of the substrate by using some first nozzles of the first head;
spraying an organic material solution onto the plurality of second pixel regions of the substrate by using some second nozzles of the second head;
randomly and alternately spraying an organic material solution onto the first subregions of the substrate by using other first nozzles of the first head and onto the second subregions of the substrate by using other second nozzles of the second head, such that an organic material solution pattern having a comb-tooth shape is formed,
wherein the location of the boundary between the first and second subregions varies for each row; and
forming spacers by hardening the organic material solution sprayed onto the plurality of first, second and third pixel regions.

2. The method of forming a spacer according to claim 1, wherein the first nozzles and the second nozzles are arranged in a zigzag pattern on the first head and the second head, respectively.

3. The method of forming a spacer according to claim 1, further comprising inclining the first head and the second head at a predetermined angle relative to the substrate such that the distance between the adjacent first nozzles and the distance between adjacent second nozzles coincide with the distance between the adjacent first, second or third pixel regions.

4. The method of forming a spacer according to claim 1, wherein spraying the organic material solution onto the plurality of third pixel regions includes a start position for every row that is different from the adjacent rows.

5. The method of forming a spacer according to claim 4, wherein when a start position in a row for the second subregion is determined in the third pixel region, the organic material solution is sprayed onto the remaining pixel regions along the row in the second subregion by using the nozzles of the head corresponding to the second pixel subregion.

6. The method of forming a spacer according to claim 5, wherein when the start position in a row for the second subregion is determined in the third pixel region, the organic material solution is sprayed onto the remaining pixel regions in the other direction along the row in the first subregion by using the nozzles of the head corresponding to the first subregion.

7. A method of fabricating a liquid crystal display panel, comprising:
providing mother substrates that include a plurality of panel regions, each of which is divided into a plurality of first, second and third pixel regions, wherein the plurality of first, second and third pixel regions are defined by a plurality of gate and data lines crossing each other and wherein the plurality of third pixel regions have first and second subregions that are adjacent to one another;

performing an array process on a mother substrate for an array substrate and a color filter process on a mother substrate for a color filter substrate;

providing an ink jet system that includes a first head having a plurality of first nozzles and a second head having a plurality of second nozzles, wherein part of the first head overlaps with part of the second head at the plurality of third pixel regions;

spraying an organic material solution onto the plurality of first pixel regions of one of the mother substrates by using some first nozzles of the first head;

spraying an organic material solution onto the plurality of second pixel regions of the mother substrate by using some second nozzles of the second head;

randomly and alternately spraying an organic material solution onto the first subregions of the substrate by using other first nozzles of the first head and onto the second subregions of the substrate by using other second nozzles of the second head, such that an organic material solution pattern having a comb-tooth shape is formed, wherein the location of the boundary between the first and second subregions varies for each row;

forming spacers to maintain an uniform cell gap between the color filter substrate and the array substrate by hardening the organic material solution sprayed onto the plurality of first, second and third pixel regions;

attaching the pair of mother substrates to one another; and separating the attached mother substrates into a plurality of liquid crystal display panels.

8. The method of fabricating a liquid crystal display panel according to claim 7, wherein the plurality of panel regions have at least two different sizes.

9. The method of fabricating a liquid crystal display panel according to claim 7, wherein the first nozzles and the second nozzles are arranged in a zigzag pattern on the first head and the second head, respectively.

10. The method of fabricating a liquid crystal display panel according to claim 7, further comprising: inclining the first and second heads at a predetermined angle relative to the substrate such that the distance between the adjacent first nozzles and the distance between the adjacent second nozzles coincide with the distance between the adjacent first, second or third pixel regions.

11. The method of fabricating a liquid crystal display panel according to 7, wherein in the randomly spraying the organic material solution, a start position of the second pixel region is different in every row regardless of the order in which the pixel regions are arranged.

12. The method of fabricating a liquid crystal display panel according to 7, wherein when the start position of the second pixel region is determined in one row in the overlap region, the organic material solution is sprayed onto the remaining pixel regions in one direction along the row by using the nozzles of the second head.

13. The method of fabricating a liquid crystal display panel according to claim 12, wherein when the start position of the second pixel region is determined in one row, the organic material solution is sprayed onto the remaining pixel regions in the other direction along the row by using the first nozzles of the first head.

14. The method of fabricating a liquid crystal display panel according to claim 7, wherein a liquid crystal is dropped on one of the mother substrate for the array substrate and the mother substrate for the color filter substrate, and a sealant is coated on the other mother substrate.

15. The method of fabricating a liquid crystal display panel according to claim 14, wherein the mother substrate on which the liquid crystal is dropped and the mother substrate on which the sealant is coated are attached to each other.

16. The method of fabricating a liquid crystal display panel according to claim 7, wherein a spacer is formed on one of the mother substrate for the array substrate and the mother substrate for the color filter substrate, and a sealant is coated on the other mother substrate.

17. The method of fabricating a liquid crystal display panel according to claim 16, wherein the mother substrate on which the spacer is formed and the mother substrate on which the sealant is coated are attached to each other.

18. The method of fabricating a liquid crystal display panel according to claim 17, wherein the attached mother substrates are cut into a plurality of liquid crystal display panels, and then a liquid crystal is injected into each of the liquid crystal display panels.

* * * * *